US010955820B2

(12) United States Patent
O'Connor et al.

(10) Patent No.: US 10,955,820 B2
(45) Date of Patent: Mar. 23, 2021

(54) ADDITIVE 3-DIMENSIONAL (3D) CORE DESIGN

(71) Applicant: Siemens Industry Software Inc., Plano, TX (US)

(72) Inventors: John O'Connor, East Greenwich, RI (US); Sean O'Hearn, Worcester, MA (US); Kelvin Juarbe, Roslindale, MA (US)

(73) Assignee: Siemens Industry Software Inc., Plano, TX (US)

( * ) Notice: Subject to any disclaimer, the term of this patent is extended or adjusted under 35 U.S.C. 154(b) by 71 days.

(21) Appl. No.: 16/276,815

(22) Filed: Feb. 15, 2019

(65) Prior Publication Data

US 2020/0264584 A1    Aug. 20, 2020

(51) Int. Cl.
*G05B 19/4099*    (2006.01)
*B33Y 50/00*    (2015.01)

(52) U.S. Cl.
CPC .......... *G05B 19/4099* (2013.01); *B33Y 50/00* (2014.12); *G05B 2219/35134* (2013.01); *G05B 2219/49007* (2013.01)

(58) Field of Classification Search
CPC ...... G05B 19/4099; G05B 2219/35134; G05B 2219/49007; B33Y 50/00
See application file for complete search history.

(56) References Cited

U.S. PATENT DOCUMENTS

| | | | | |
|---|---|---|---|---|
| 9,361,553 | B1* | 6/2016 | Ito | G06T 19/20 |
| 2014/0330420 | A1 | 11/2014 | Maclean | |
| 2015/0193560 | A1* | 7/2015 | Spector | B33Y 80/00 700/98 |
| 2016/0096318 | A1* | 4/2016 | Bickel | B29C 64/00 264/40.1 |
| 2016/0107432 | A1* | 4/2016 | Krajca | B26D 1/04 156/250 |
| 2017/0055629 | A1* | 3/2017 | Schickling | A43B 7/1465 |

(Continued)

FOREIGN PATENT DOCUMENTS

WO    2015057391 A1    4/2015

OTHER PUBLICATIONS

Alessandro Airoldi et al., "Design of a Morphing Airfoil with Composite Chiral Structure", Journal of Aircraft, vol. 49, No. 4, Jul. 1, 2012, pp. 1008-1019.

(Continued)

*Primary Examiner* — Thomas C Lee
*Assistant Examiner* — Michael Tang (57) ABSTRACT

A system may include a 3D core design engine and a 3D core printing engine. The 3D core design engine may be configured to determine, in a CAD model, an under-core ply of a composite part and a core footprint on the under-core ply specified for an additive 3D core to be manufactured via additive manufacturing for insertion into the composite part, compute a bottom core surface of the additive 3D core from the under-core ply and core footprint, access core design parameters for the additive 3D core; and construct an additive 3D core design in the CAD model based on the computed bottom core surface and the core shape parameters. The 3D core printing engine may be configured to store the additive 3D core design to support subsequent manufacture of the additive 3D core via additive manufacturing.

20 Claims, 6 Drawing Sheets

(56) References Cited

U.S. PATENT DOCUMENTS

2017/0080643 A1* 3/2017 Premakumar .......... G06F 30/00
2018/0251205 A1* 9/2018 LeBlanc ............... B32B 27/365

OTHER PUBLICATIONS

Türk et al., "Composites Part Production with Additive Manufacturing Technologies", Science Direct, Elsevier, 1st Cirp Conference on Composite Materials Parts Manufacturing, Procedia CIRP 66, 2017, pp. 306-311.

* cited by examiner

ADDITIVE 3-DIMENSIONAL (3D) CORE DESIGN

BACKGROUND

Computer systems can be used to create, use, and manage data for products and other items. Examples of computer systems include computer-aided design (CAD) systems (which may include computer-aided engineering (CAE) systems), visualization and manufacturing systems, product data management (PDM) systems, product lifecycle management (PLM) systems, and more. These systems may include components that facilitate design and simulated testing of product structures and product manufacture.

SUMMARY

Disclosed implementations include systems, methods, devices, and logic that support design of additive 3-dimensional (3D) cores.

In one example, a method may be performed, executed, or otherwise carried out by a computing system. The method may include determining, in a CAD model, an under-core ply of a composite part and a core footprint on the under-core ply, the under-core ply and core footprint specified for an additive 3D core to be manufactured via additive manufacturing and to be inserted into the composite part; computing a bottom core surface of the additive 3D core from the under-core ply and core footprint; accessing core design parameters for the additive 3D core, the core design parameters comprising core thickness parameters and core shape parameters that define the additive 3D core; constructing an additive 3D core design in the CAD model for the additive 3D core based on the computed bottom core surface and the core design parameters; and storing the additive 3D core design to support subsequent manufacture of the additive 3D core via additive manufacturing.

In another example, a system may include a 3D core design engine and a 3D core printing engine. The 3D core design engine may be configured to determine, in a CAD model, an under-core ply of a composite part and a core footprint on the under-core ply specified for an additive 3-dimensional (3D) core to be manufactured via additive manufacturing for insertion into the composite part; compute a bottom core surface of the additive 3D core from the under-core ply and core footprint; access core design parameters for the additive 3D core, the core design parameters comprising core thickness parameters and core shape parameters that define the additive 3D core; and construct an additive 3D core design in the CAD model based on the computed bottom core surface and the core shape parameters. The 3D core printing engine may be configured to store the additive 3D core design to support subsequent manufacture of the additive 3D core via additive manufacturing.

In yet another example, a non-transitory machine-readable medium may store instructions executable by a processor. Upon execution, the instructions may cause the processor or a computing system to determine, in a CAD model, an under-core ply of a composite part and a core footprint on the under-core ply, the under-core ply and core footprint specified for an additive 3D core to be manufactured via additive manufacturing and to be inserted into the composite part; compute a bottom core surface of the additive 3D core from the under-core ply and core footprint; access core design parameters for the additive 3D core, the core design parameters comprising core thickness parameters and core shape parameters that define the additive 3D core; construct an additive 3D core design in the CAD model for the additive 3D core based on the computed bottom core surface and the core shape parameters; and store the additive 3D core design to support subsequent manufacture of the additive 3D core via additive manufacturing.

BRIEF DESCRIPTION OF THE DRAWINGS

Certain examples are described in the following detailed description and in reference to the drawings.

DETAILED DESCRIPTION

Computing systems, such as CAD systems, may support the design and manufacture of composite parts. Composite parts (also referred to as composite laminates) may refer to any object or structure that is composed of multiple layers of material (e.g., plies). Composite parts may be formed by sequentially layering ply upon ply to construct the composite part or composite laminate, often times through use of a composite part layup tool. In some examples, the composite part may also undergo a curing or other post-layup process to form (e.g., seal or harden) the composite part. Composite parts are used across a multitude of industries, such as aerospace, automotive, transport, textile, and many more. In some instances, composite parts may support insertion of a core (also referred to as core material) to alter the physical properties of the composite part, e.g., to control the thickness, stiffness, moment of inertia, thermal characteristics, impact resistance, weight distribution, load bearing capability, or various other composite part characteristics.

Design of cores for composite parts is tedious and error prone. Present core design techniques involve physical manufacture of the composite parts, and trial and error with physical materials to manually fit the core into a physical composite part. Effective core construction is increasingly challenging for composite parts with compound curvature characteristics and simple core surfaces will not fit precisely into the composite part. Cores designed through such trial-and-error techniques are often imprecise, which may impact the degree to which the cores can effectively control the physical characteristics of the composite part.

The disclosure herein may provide systems, methods, devices, and logic for the design of additive 3D cores. As used herein, an additive 3D core may refer to a core of a composite part that is designed for physical manufacture via additive manufacturing. Additive manufacturing (which can encompass 3D printing) may be performed through use of 3D printers to construct objects through material deposition. The additive 3D core design features described herein may provide capabilities to define an additive 3D core based on the characteristics (e.g., curvature) of an under-core ply and various core design parameters. Such capabilities may be implemented as part of a CAD system, by which additive 3D core designs can be constructed prior to physical manufacture, and done so with increased efficiency, accuracy, and effectiveness. In particular, the additive 3D core design features described herein may increase the precision at which 3D cores can be design for insertion in to composite parts, and with increased flexibility and capability in defining specific features, effects, and characteristics of 3D cores. These and other benefits of the disclosed additive 3D core design features are described in greater detail herein.

Figure 1:
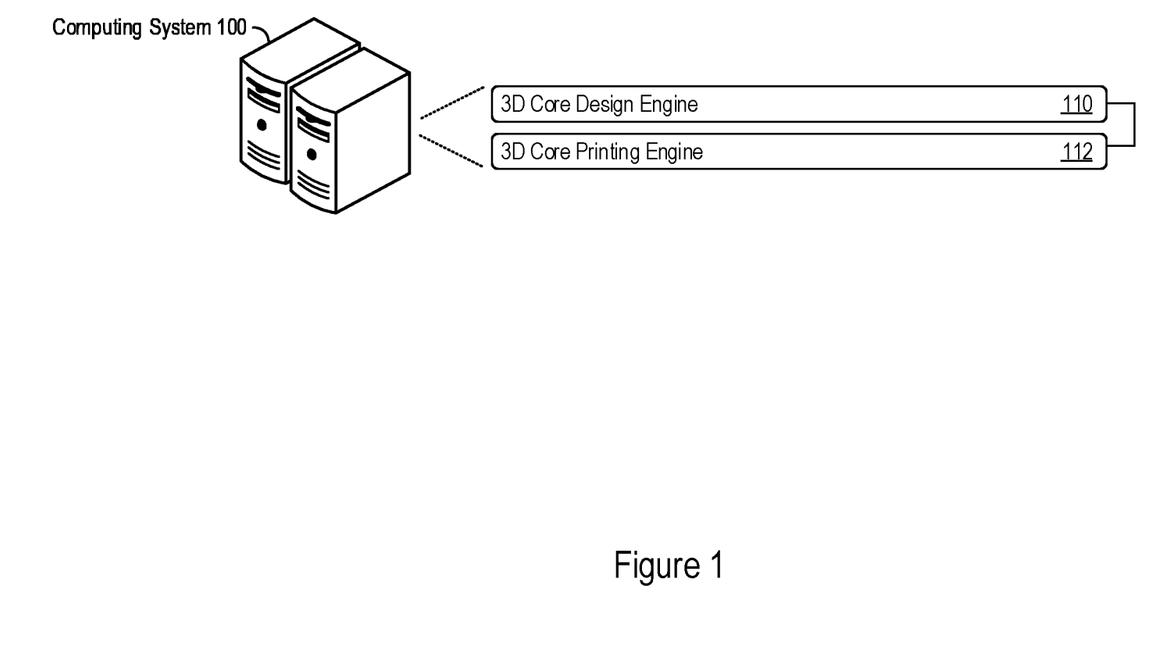
FIG. 1 shows an example of a computing system that supports design of additive 3D cores.

FIG. 1 shows an example of a Computing system 100 that supports design of additive 3D cores. The computing system 100 may take the form of a single or multiple computing devices such as application servers, compute nodes, desktop or laptop computers, smart phones or other mobile devices, tablet devices, embedded controllers, and more. In some implementations, the computing system 100 implements a CAD tool or CAD program through which a user may design and simulate testing of product structures, such as composite parts and additive 3D cores.

As described in greater detail herein, the computing system 100 supports the design of additive 3D cores. In particular, the computing system 100 may provide various mechanisms and capabilities for CAD users to construct additive 3D cores as part of a CAD model, thereby supporting digital construction, analyses, and simulation of additive 3D cores prior to physical manufacture. The provided additive 3D core design capabilities may allow for precise 3D core definitions, from curvatures, shape characteristics, internal compositions, and any other configurable 3D core characteristics. In doing so, the computing system 100 may provide 3D core construction capabilities with increased precision. For example, the computing system 100 may support 3D core definitions that precisely contact the adjacent plies of the composite part. In that regard, additive 3D cores designed by the computing system 100 may have an exact curvature that conforms to the curvature of the adjoining plies, and such design precision may be practically impossible with 3D cores constructed physically via approximation and trial-and-error. In effect, the computing system 100 may support the design of additive 3D cores with increased precision and accuracy.

As an example implementation to support the additive 3D core design features described herein, the computing system 100 shown in FIG. 1 includes a 3D core design engine 110 and a 3D core printing engine 112. The computing system 100 may implement the engines 110 and 112 (and components thereof) in various ways, for example as hardware and programming. The programming for the engines 110 and 112 may take the form of processor-executable instructions stored on a non-transitory machine-readable storage medium and the hardware for the engines 110 and 112 may include a processor to execute those instructions. A processor may take the form of single processor or multi-processor systems, and in some examples, the computing system 100 implements multiple engines using the same computing system features or hardware components (e.g., a common processor or a common storage medium).

In operation, the 3D core design engine 110 may determine, in a CAD model, an under-core ply of a composite part and a core footprint on the under-core ply specified for an additive 3D core to be manufactured via additive manufacturing for insertion into the composite part. The 3D core design engine 110 may also compute a bottom core surface of the additive 3D core from the under-core ply and core footprint, access core design parameters for the additive 3D core (the core design parameters including) core thickness parameters and core shape parameters that define the additive 3D core), and construct an additive 3D core design in the CAD model based on the computed bottom core surface and the core shape parameters. In operation, the 3D core printing engine 112 may store the additive 3D core design to support subsequent manufacture of the additive 3D core via additive manufacturing. In some examples, the 3D core printing engine 112 may also provide the additive 3D core design to printing hardware for manufacture via additive manufacturing.

Figure 2:
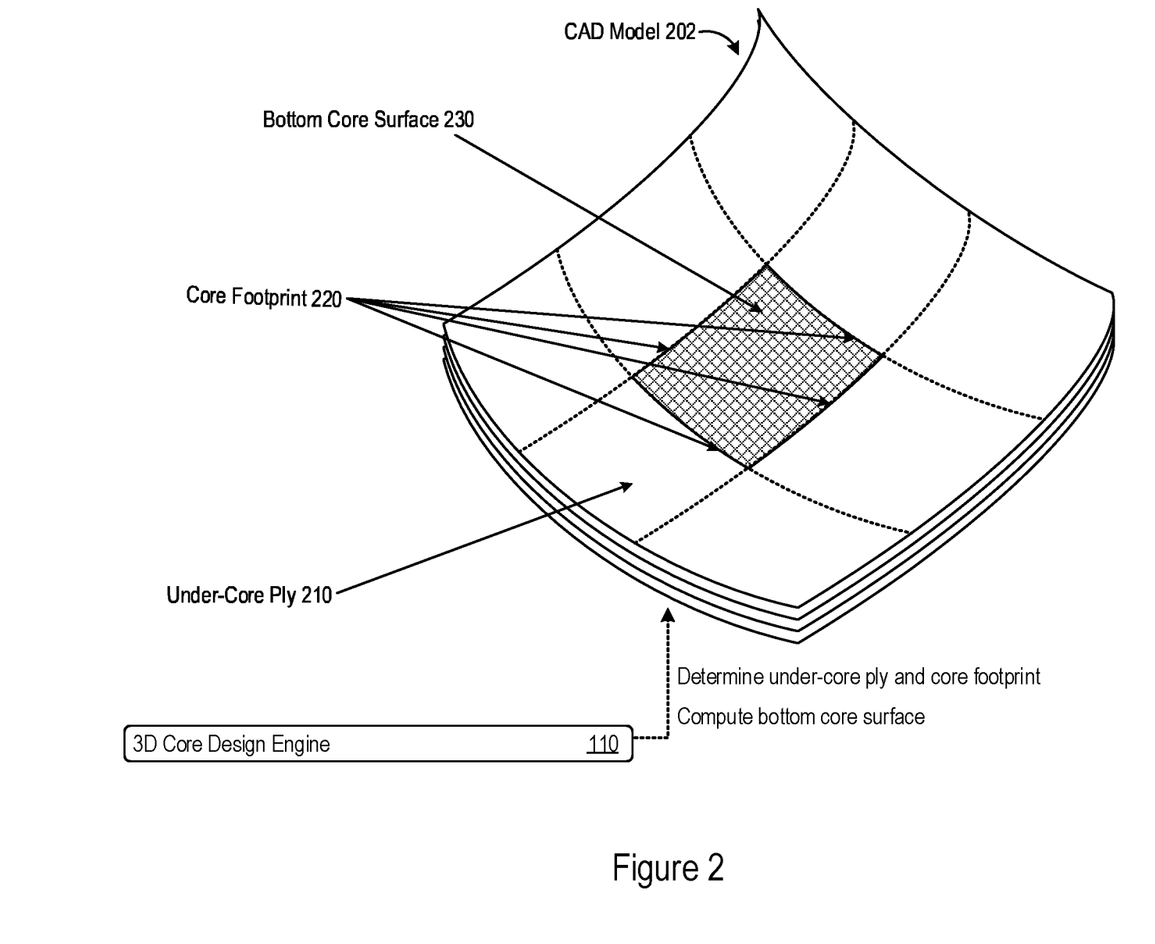
FIG. 2 shows example design determinations that a 3D core design engine may make to define additive 3D cores.

These and other additive 3D core design features according to the present disclosure are described in greater detail next. Many of the examples are described with the 3D core design engine 110 and 3D core printing engine 112 as examples, though other implementations are contemplated FIG. 2 shows example design determinations that the 3D core design engine 110 may make to define additive 3D cores. In general, the 3D core design engine 110 may define an additive 3D core based on certain ply characteristics of a composite part and core design parameters (e.g., geometric shape definitions, surface features, interior composition descriptions, etc.)

To illustrate through FIG. 2, the 3D core design engine 110 may determine characteristics of a composite part that define a bottom core surface of an additive 3D core. In particular, the 3D core design engine 110 may determine an under-core ply and a core footprint upon (e.g., projected on) the under-core ply. The under-core ply determined by the 3D core design engine 110 may refer to the particular ply (i.e., laminate layer) upon which the additive 3D core will be inserted upon. Put another way, the under-core ply may refer to the particular ply that a manufactured 3D core will physically rest upon during ply layup and composite part construction. Under-core ply determination may be specified during design of the composite part. For instance, the 3D core design engine 110 may access a CAD model 202 of a composite part to make such determinations in support of additive 3D core design.

In FIG. 2, the 3D core design engine 110 identifies the specific ply in the CAD model 202 labeled as the under-core ply 210. In some implementations, the 3D core design engine 110 identifies the under-core ply 210 as the particular ply upon which the additive 3D core will rest based on user input. The user input may identify the under-core ply 210 directly (e.g., via a mouse click or other ply selection capability) or indirectly. For indirect identifications, the user input may be a particular location, height, or position in the composite part in which the additive 3D core will be inserted.

In such cases, the 3D core design engine 110 may determine the under-core ply 210 based on a specific height or position requirements specified by the user input. In doing so, the core design engine 110 may account for the height of stacked uncured plies up to the desired additive 3D core position to specifically identify the under-core ply 210. Explained further, composite parts may undergo a curing process that affects the height, thickness, and other physical characteristics of plies (e.g., reducing the height of stacked uncured plies during the curing process). For a desired core position input specifically for a completed (e.g., cured) composite part, the 3D core design engine 110 may determine the height in the uncured composite part that corresponds to the specific core position in the completed composite part. Then, the 3D core design engine 110 may identify the ply at this height in the uncured composite part as the under-core ply 210 upon which the additive 3D core will rest upon. As such, the 3D core design engine 110 may determine under-core ply 210 as the particular 3D core position of an additive 3D core (e.g., within a coordinate or reference system of the CAD model 202).

The 3D core design engine 110 may determine a core footprint on the under-core ply 210. The core footprint may take the form of any curve, projection, or boundary that outlines the additive 3D core on the under-core ply 210. In FIG. 2, the 3D core design engine 110 identifies the core footprint 220 based on the intersection of dotted boundary lines, which may be specified via user input. The core footprint 220 may outline the physical contact that the bottom surface of the additive 3D core will make with the under-core ply 210, and may thus take the form of any number of projections, curves, or perimeters along the under-core ply 210. In FIG. 2, arrows point to specific points of the core footprint 220 on the under-core ply 210, though the core footprint 220 may comprise the entire shape outline projected unto under-core ply 210.

From the under-core ply 210 and the core footprint 220, the 3D core design engine 110 may compute a bottom core surface for the additive 3D core. The 3D core design engine 110 may do so by extracting a cropped shape from the under-core ply 210 along the core footprint 220. In FIG. 2, the 3D core design engine 110 computes the bottom core surface 230 from the under-core ply 210 and the core footprint 220, shown as the patterned region on the under-core ply 210. In some implementations, the 3D core design engine 110 does so by determining an uncured thickness of plies in the composite part up to the under-core ply 210 and setting a shape of the bottom core surface 230 as a shape of a portion of the under-core ply 210 as outlined by the core footprint 220.

By extracting the under-core surface 230 from the under-core ply 210 itself, the 3D core design engine 110 may define the bottom geometric shape of the additive 3D core with increased precision to distinctly match the curvature of the under-core ply 210. As compared to manual or trial-based core construction techniques on physical plies, the computed bottom core surface 230 may more accurately mirror the physical structure of the under-core ply 210 at the core insertion position in the composite part. In some instances, such precision in core definition may allow for a near-perfect fit of the additive 3D core in the physically constructed composite part.

As described above, the 3D core design engine 110 may define additive 3D cores (at least portions thereof) based on the physical characteristics of under-core plies in composite parts. In addition to the bottom core surface 230, the 3D core design engine 110 may define various other portions of an additive 3D core as well, some of which are described next in FIG. 3 in connection with core design parameters for an additive 3D core.

Figure 3:
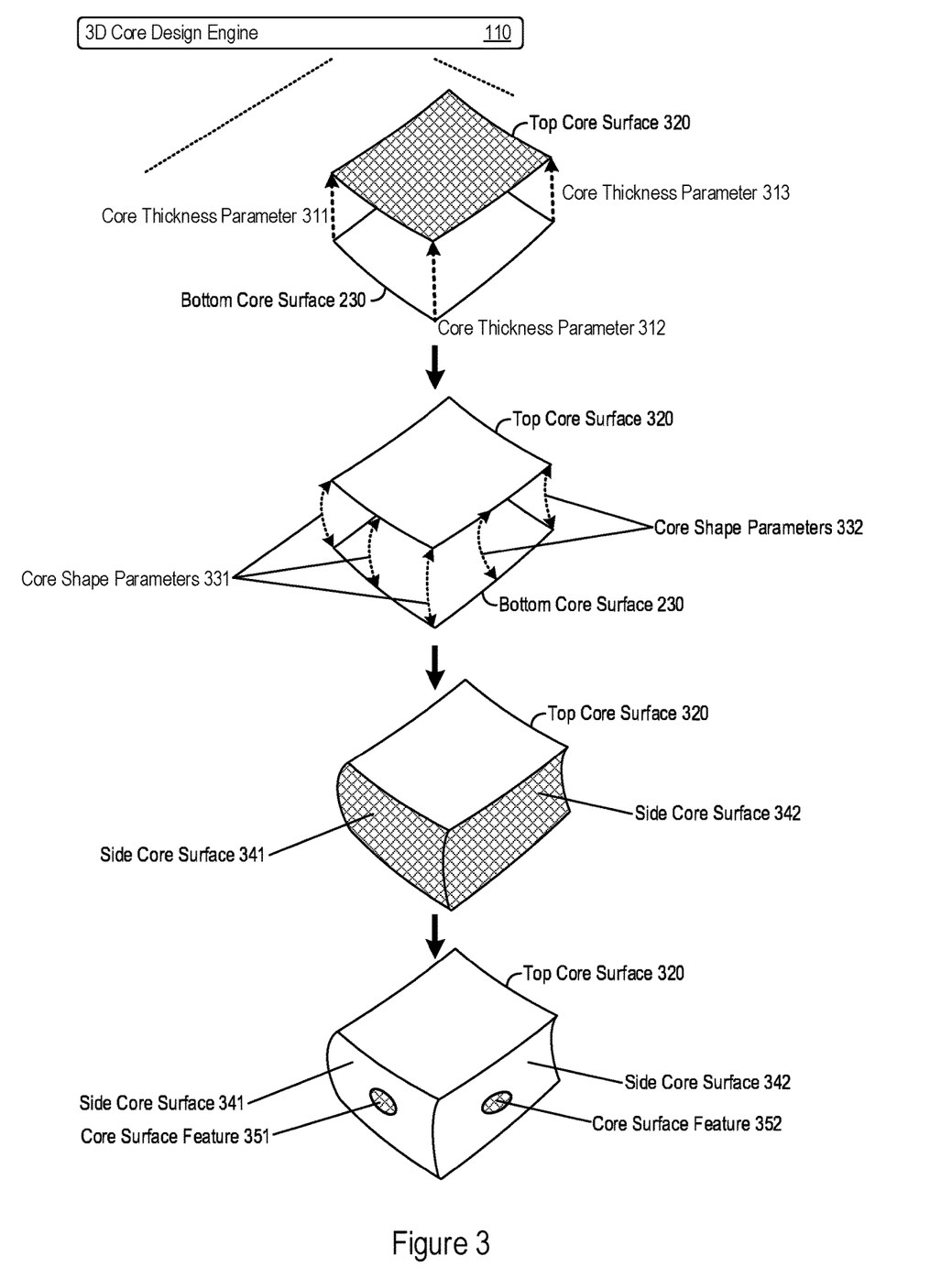
FIG. 3 also shows example design determinations that the 3D core design engine may make to define additive 3D cores.

FIG. 3 shows various example design determinations that the 3D core design engine 110 may make to define additive 3D cores. In defining an additive 3D core in a CAD model, the 3D core design engine 110 may access different core design parameters. Core design parameters may refer to any configuration or parameter that specifies a characteristic of an additive 3D core. In some implementations, core design parameters are predetermined, e.g., to effectuate particular core shapes, core physical characteristics, or alterations to the behavior of a corresponding composite part. Additionally or alternatively, core design parameters may be obtained via user input, whether during composite part design via CAD tools, as part of a separate core design process, or combinations thereof. Some examples of core design parameters are presented in FIG. 3.

As an example core design parameter, the 3D core design engine 110 may access core thickness parameters. The core thickness parameter may specify the particular thickness (e.g., height) of the additive 3D core. Core thickness parameters may be uniform, e.g., specifying a uniform height for the additive 3D core expressed as an offset value from the bottom core surface 230. In such cases, the top surface of the additive 3D core may be parallel (e.g., mirror) the curvature of the bottom core surface 230. In other instances, core thickness parameters may vary at different points of the additive 3D core. User input, for example, may specify varying core height at different points along the bottom core surface 230. In the specific example shown in FIG. 3, the 3D core design engine 110 accesses the core thickness parameters 311, 312, and 313, each specific to a different point (corner) of the bottom core surface 230 and specifying different height values for the 3D additive core at the respective points. The core thickness parameters 311, 312, and 313 are depicted as dotted arrows indicative of a specific height of the additive 3D core at different points in the bottom core surface 230.

The 3D core design engine 110 may compute top core surface for an additive 3D core by offsetting the computed bottom core surface according to core thickness parameters. In FIG. 3, the 3D core design engine 110 offsets the bottom core surface 230 by the core thickness parameters 311, 312, and 313 (and others, not pictured) to form the top core surface 320 (shown as the patterned shape adjacent to the depicted core thickness parameters 311, 312, and 313). As such, the core thickness parameters may, in effect, specify the shape of the top core surface 320 of an additive 3D core. In other implementations, characteristics of the top core surface of an additive 3D core may be directly defined (e.g., by user input or according to a predefined core design). In such cases, core thickness parameters may be unnecessary or implicitly determined from the provided top core surface.

As another example of core design parameters, the 3D core design engine 110 may access core shape parameters. Core shape parameters may refer to any parameter or configuration that defines the exterior shape of an additive 3D core. In that regard, the curvature of the under-core ply 210 may be considered a core shape parameters (at least implicitly) that defines the geometric curvature of the bottom core surface 230 in 3D. In a similar manner, the 3D core design engine 110 may access core shape parameters that expressly specify the curvature of a top core surface (e.g., in lieu of core thickness parameters).

Core shape parameters may additionally or alternatively include bevel angles, drop radii, as well as other parametric or geometric parameters that define side surfaces of the additive 3D core. To the extent the bottom core surface 230 projects beyond the top core surface 320 or vice versa (e.g., when the additive 3D core is a trapezoidal or inverse-trapezoidal shape), the core shape parameters may specify the angle or degree to which the side surfaces bend, curve, or extrude to connect the top and bottom core surfaces. In FIG. 3, the 3D core design engine 110 accesses the core shape parameters 331 and 332, which may define the shape of the core sides between the bottom core surface 230 and top core surface 320 at various points.

The 3D core design engine 110 may compute any number of core side surfaces for an additive 3D core by applying the core shape parameters to define the core side surfaces, e.g., between the computed top and bottom core surfaces of the additive 3D core. In FIG. 3, the 3D core design engine 110 computes the side core surfaces labeled as 341 and 342, shown as patterned surfaces adjacent to the top core surface 320.

As yet another example of core design parameters, the 3D core design engine 110 may access core surface features for an additive 3D core. Core surface features may refer to any surface-specific modifications for the additive 3D core. Examples of core surface features may include surface modifications to insert holes, mounting points, sensor insertion points, attachment wedges, or any other core surface alteration according any number of design purposes. Core surface features may depend on the specific use of the additive 3D core, and different industrial applications may warrant different core surface features for the additive 3D core.

The 3D core design engine 110 may modify surfaces of the additive 3D core to effectuate the modifications specified by the core surface features. In FIG. 3, the 3D core design engine 110 accesses and adds the core surface features 351 and 352 respectively to the side core surface 341 and 342. As shown in FIG. 3, the core surface features 351 and 352 may specify different holes (e.g., mounting positions) and are depicted as patterned ovals on the side core surfaces 341 and 342. Effectuated core surface features by the 3D core design engine 110 may create space along the surfaces and interior of the additive 3D core (e.g., holes, attachment crevices) or insert protrusions from the surface (e.g., hook mounting attachments).

As such, the 3D core design engine 110 may define various characteristics of an additive 3D core via core design parameters. While some examples of core design parameters are shown in FIG. 3, various other core design parameters are contemplated herein and some of which are described further in FIG. 4.

Figure 4:
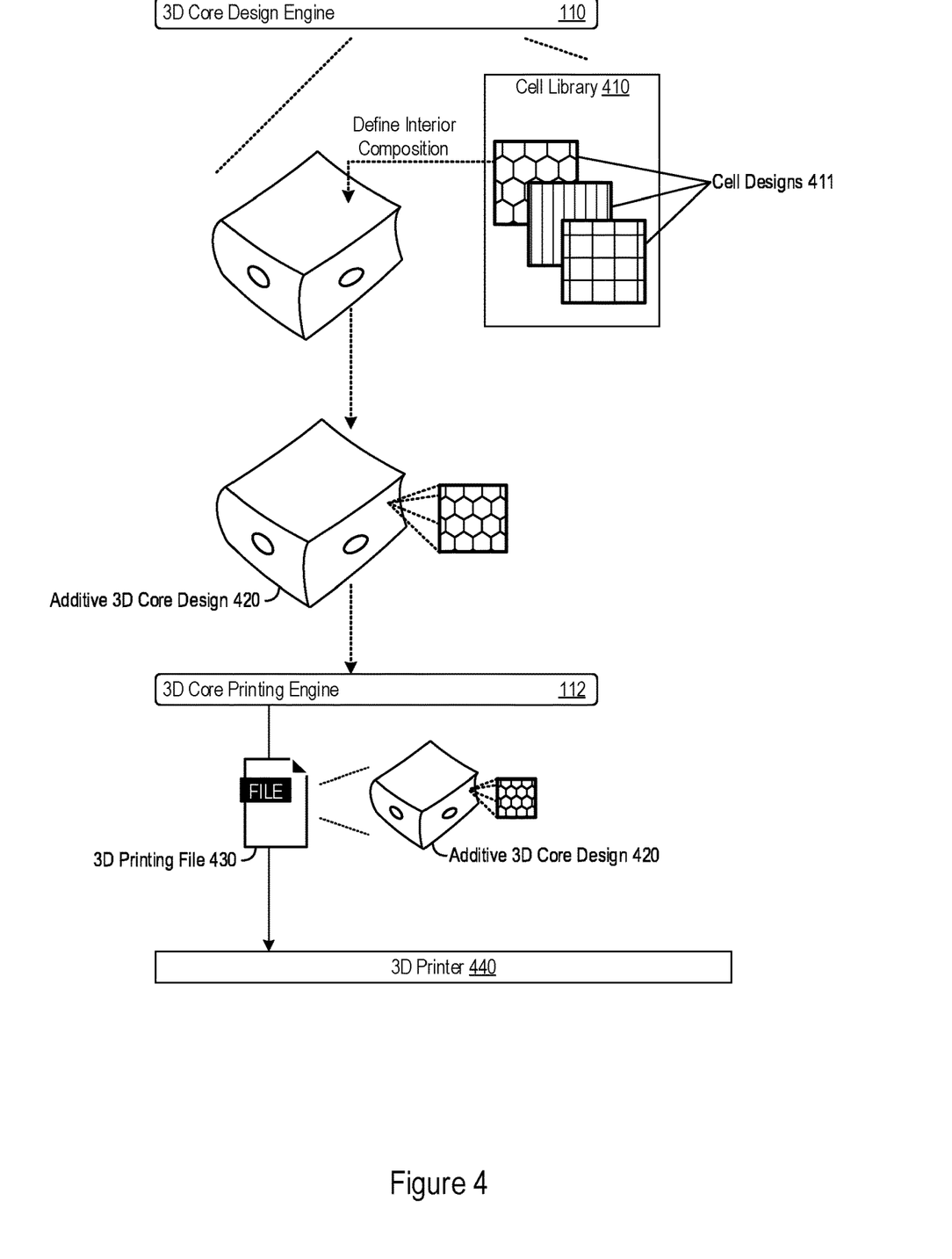
FIG. 4 shows an example construction of an additive 3D core design that can be used for physical manufacture of an additive 3D core via additive manufacturing.

FIG. 4 shows an example construction of an additive 3D core design that can be used for physical manufacture of an additive 3D core via additive manufacturing. FIG. 4 also presents interior composition parameters as yet another example of core design parameters supported by the 3D core design engine 110.

The 3D core design engine 110 may define an interior composition of an additive 3D core through interior composition parameters. Interior composition parameters may specify any type of 3D shape or design internal to the additive 3D core. In that regard, the interior composition parameters may guide the 3D core design engine 110 to infill an additive 3D core in particular ways. The specific interior composition of additive 3D cores may vary based on the specific functionality of the core, whether to adjust the weight, strength, stiffness or other performance related characteristic of a composite part.

As such, the 3D core design engine 110 may select and apply interior composition parameters correlated to the desired performance characteristics of an additive 3D core. In some implementations, interior composition parameters take the form of 3D cell shape, cell material, cell size, and cell orientation parameters used to define the interior composition of the additive 3D core. These cell parameters may, for example, be stored in a cell library 410 that the 3D core design engine 110 may access remotely or itself implement. Different cell designs may vary in structure to exhibit different performance characteristics, and example cell designs include lattice structures, honeycomb structures, and more. The cell library 410 may store any number of predefined cell designs, such as the cell designs 411 shown in FIG. 4, which the 3D core design engine 110 may apply to the design of an additive 3D core.

By selecting and applying a cell design, the 3D core design engine 110 may tailor an additive 3D core to alter specific physical characteristics of a corresponding composite part. The specific cell design 411 may be specifically configured for the additive 3D core, including material, orientation, cell shape and size. Examples core materials include balsa wood, nomex foam material, aluminum honeycomb cores, etc. Example cell shapes include honeycomb and lattice structures. Additive manufacturing techniques support physical construction of objects with specific interior compositions, and the 3D core design engine 110 may leverage the flexibility of additive manufacturing to specify core interior compositions with increased specificity, detail, and precision. While some example cell characteristics are provided herein, the cell library 410 may store near-limitless variations of different cell designs, each to alter physical characteristics of composite parts in different ways, e.g., with regards to weight capacity, load bearing characteristics, impact or thermal resistance, and more.

As yet another implementation feature, the 3D core design engine 110 may apply a selected cell design, shape, and size at a determined cell orientation. In some instances, the cell orientation may be normal (e.g., perpendicular) to the bottom core surface 230 of an additive 3D core. Other cell orientations are contemplated, and may be varied based on the desired physical characteristics of the additive 3D core and composite part. To apply a selected cell design, the 3D core design engine 110 may fill (e.g., populate) the internal space of the additive 3D core as constrained by computed core surfaces (including surface features) using 3D cell structures with a cell shape, size, orientation, and material as specified by the cell parameters of the selected cell design. In doing so, the 3D core design engine 110 may account for any specific internal attributes of the additive 3D core. For instance, the core surface features 351 and 352 may specify the insertion of holes in the side surfaces 341 and 342, but a core surface feature may also specify a hole depth or hole shape that applies to an interior portion of the additive 3D core. The 3D core design engine 110 may infill the additive 3D core with the selected cell design (and other cell parameters) in a manner that maintains the specific core surface features (or other core design features) specified for the additive 3D core.

As described herein, the 3D core design engine 110 may define any number of geometric, physical, parametric, and shape characteristics of an additive 3D core. From these defined characteristics, the 3D core design engine 110 may construct an additive 3D core design. The additive 3D core design may be the actual 3D representation of the additive 3D core as defined by the 3D core design engine 110 in any combination of the various ways described herein. In FIG. 4, the 3D core design engine 110 constructs the additive 3D core design 420, which may include the bottom core surface 230 computed from the under-core ply 210 and core footprint 220, the top core surface 320, the side core surfaces 341 and 342 (as modified by the core surface features 351 and 352) and with an interior composition as defined via a selected cell design from the cell library 410 (shown as the honeycomb cell structure in FIG. 4). In that regard, the 3D core design 420 may include the requisite detail and data to define (e.g., in whole) the additive 3D core according to the ply characteristics of the composite part and accessed core design parameters.

The 3D core design engine 110 may construct the additive 3D core design 420 as part of a CAD model (e.g., the CAD model 202), which may provide a 3D representation of the additive 3D core as part of the composite part design. As such, the 3D core design engine 110 may support design of additive 3D cores with increased precision and capability, e.g., allowing for a precise CAD-based definition of any contemplated aspect of the additive 3D core such that the additive 3D core design 420 may precisely fit into a composite part. In some implementations, the additive 3D core design 420 constructed by the 3D core design engine 110 is represented as a boundary representation (B-Rep), surface mesh, faceted surface, or any other 3D representation.

Upon construction, the 3D core printing engine 112 may store the additive 3D core design 420 for subsequent manufacture of the additive 3D core via additive manufacturing. To do so, the 3D core printing engine 112 may store the constructed additive 3d core design in a 3D printing file 430 or other suitable format. Such storage of the additive 3D core design 420 may be in a local memory of a CAD tool or CAD system or in a remote storage system (e.g., cloud storage or external file repository). The stored additive 3D core design 420 may be subsequently accessed for physical manufacture of additive 3D cores.

In some implementations, the 3D core printing engine 112 may provide the additive 3D core design 420 to printing hardware for manufacture of the additive 3D core via additive manufacturing. In FIG. 4, the 3D core printing engine 112 provides a 3D printing file 430 (that includes the additive 3D core design 420) to printing hardware in the form of a 3D printer 440, and the 3D printer 440 may physically construct the additive 3D core with the specific design, parameters, and features as embodied in the additive 3D core design 420 constructed by the 3D core design engine 110. The 3D printer 440 may include controllers and other logic to interpret and construct additive 3D core design 420. Although illustrated separately, the 3D core printing engine 112 itself may include the 3D printer 440 in some examples.

In any of the ways described herein, the 3D core design engine 110 and 3D core printing engine 112 may support additive 3D core design. In doing so, the 3D core design engine 110 may provide unique capabilities to define a 3D core shape for an additive 3D core based on ply curvatures and specific core characteristics as specified through core design parameters. By defining the core based on under-core plies, the 3D core design engine 110 may increase the precision and accuracy at which additive 3D cores can fit in composite parts, especially in comparison to physical trial-and-error techniques that can only approximate core shapes to a limited degree. By providing powerful core definition capabilities via a plethora of contemplated design parameters, the 3D core design engine 110 may increase the flexibility and viability by which additive 3D cores can be designed to meet specific physical attributes (e.g., to alter the physical behavior of a corresponding composite part with increased precision).

Figure 5:
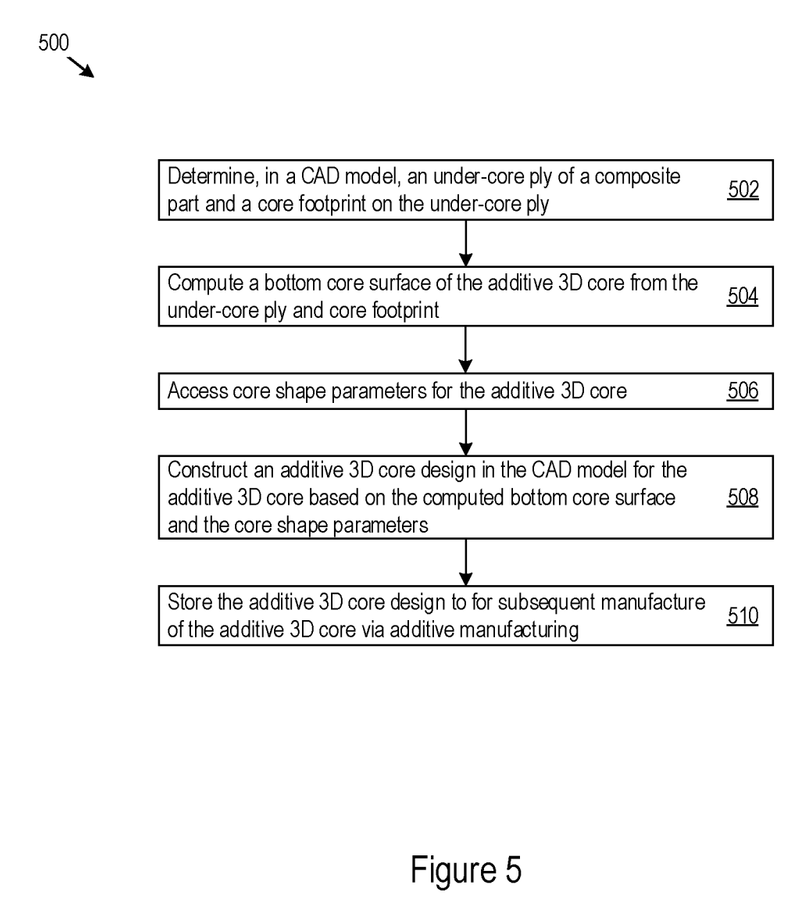
FIG. 5 shows an example of logic that a system may implement to support design of additive 3D cores.

FIG. 5 shows an example of logic 500 that a system may implement to support design of additive 3D cores. For example, the computing system 100 may implement the logic 500 as hardware, executable instructions stored on a machine-readable medium, or as a combination of both. The computing system 100 may implement the logic 500 via the 3D core design engine 110 and the 3D core printing engine 112, through which the Computing system 100 may perform or execute the logic 500 as a method to design additive 3D cores. The following description of the logic 500 is provided using the 3D core design engine 110 and the 3D core printing engine 112 as examples. However, various other implementation options by the computing system 100 are possible.

In implementing the logic 500, the 3D core design engine 110 may determining, in a CAD model, an under-core ply of a composite part and a core footprint on the under-core ply (502). As noted herein, the under-core ply and core footprint may be specified as parameters for an additive 3D core to be manufactured via additive manufacturing and to be inserted into the composite part. The 3D core design engine 110 may also compute a bottom core surface of the additive 3D core from the under-core ply and core footprint (504) and access core design parameters for the additive 3D core (506). The core design parameters may include core thickness parameters and core shape parameters that define the additive 3D core.

Also, the 3D core design engine 110 may construct an additive 3D core design in the CAD model for the additive 3D core based on the computed bottom core surface and the core design parameters (508). In implementing the logic 500, the 3D core printing engine 112 may store the additive 3D core design for subsequent manufacture of the additive 3D core via additive manufacturing (510). In some implementations, the 3D core printing engine 112 may also provide the additive 3D core design to printing hardware (e.g., a 3D printer) for manufacture of the additive 3D core via additive manufacturing.

The logic 500 shown in FIG. 5 provides but one example by which a computing system 100 may support additive 3D core designs. Additional or alternative steps in the logic 500 are contemplated herein, including according to any features described for the 3D core design engine 110, 3D core printing engine 112, or any combinations thereof.

Figure 6:
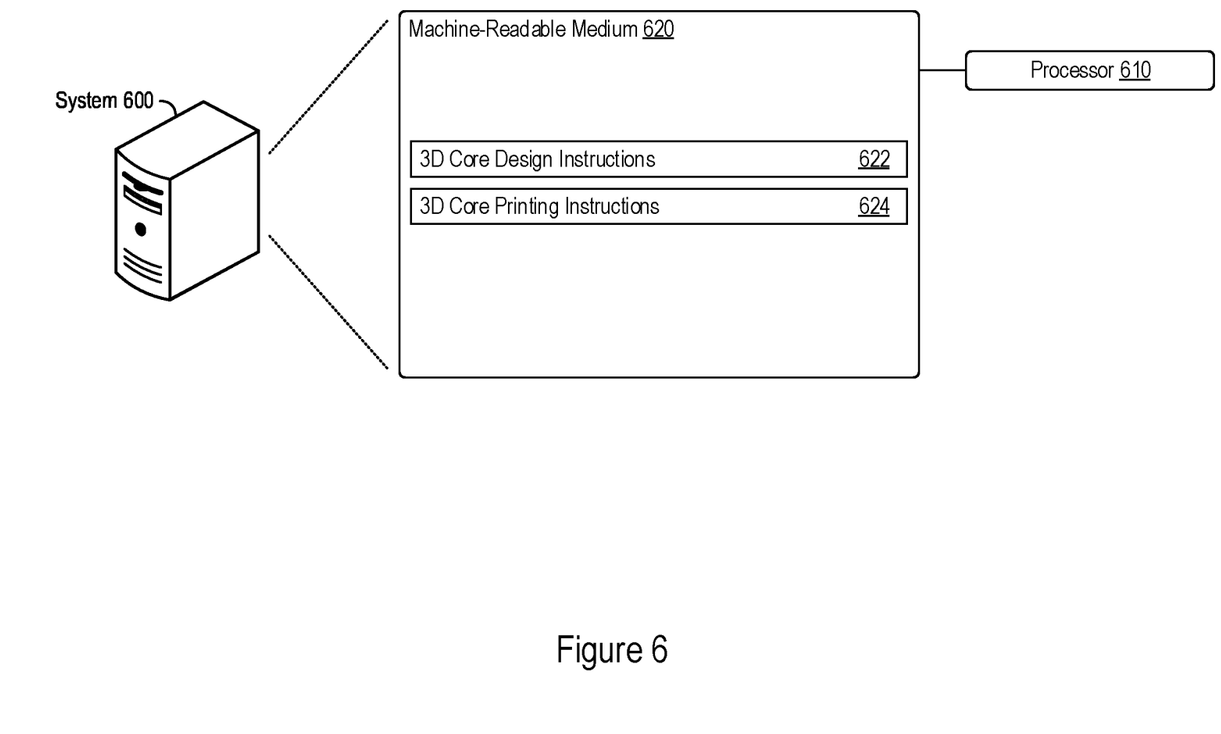
FIG. 6 shows an example of a system that supports design of additive 3D cores.

FIG. 6 shows an example of a system 600 that supports design of additive 3D cores. The system 600 may include a processor 610, which may take the form of a single or multiple processors. The processor(s) 610 may include a central processing unit (CPU), microprocessor, or any hardware device suitable for executing instructions stored on a machine-readable medium. The system 600 may include a machine-readable medium 620. The machine-readable medium 620 may take the form of any non-transitory electronic, magnetic, optical, or other physical storage device that stores executable instructions, such as the 3D core design instructions 622 and the 3D core printing instructions 624 shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 600 may execute instructions stored on the machine-readable medium 620 through the processor 610. Executing the instructions (e.g., 3D core design instructions 622 and/or the 3D core printing instructions 624) may cause the system 600 (or any other computing system) to perform any of the additive 3D core design features described herein, including according to any of the features with respect to the 3D core design engine 110, the 3D core printing engine 112, or a combination of both.

For example, execution of the 3D core design instructions 622 by the processor 610 may cause the system 600 to determine, in a CAD model, an under-core ply of a composite part and a core footprint on the under-core ply, the under-core ply and core footprint specified for an additive 3D core to be manufactured via additive manufacturing and to be inserted into the composite part; compute a bottom core surface of the additive 3D core from the under-core ply and core footprint; access core design parameters for the additive 3D core, the core design parameters comprising core thickness parameters and core shape parameters that define the additive 3D core; and construct an additive 3D core design in the CAD model for the additive 3D core based on the computed bottom core surface and the core shape parameters. Execution of the 3D core printing instructions 624 by the processor 610 may cause the system 600 to store the additive 3D core design for subsequent manufacture of the additive 3D core via additive manufacturing.

Any additional or alternative features as described herein may be implemented via the 3D core design instructions 622, 3D core printing instructions 624, or a combination of both.

The systems, methods, devices, and logic described above, including the 3D core design engine 110 and the 3D core printing engine 112, may be implemented in many different ways in many different combinations of hardware, logic, circuitry, and executable instructions stored on a machine-readable medium. For example, the 3D core design engine 110, the 3D core printing engine 112, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the 3D core design engine 110, the 3D core printing engine 112, or combinations thereof.

The processing capability of the systems, devices, and engines described herein, including the 3D core design engine 110 and the 3D core printing engine 112, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
   by a computing system:
      determining, in a computer-aided design (CAD) model, an under-core ply of a composite part and a core footprint on the under-core ply, the under-core ply and core footprint specified for an additive 3-dimensional (3D) core to be manufactured via additive manufacturing and to be inserted into the composite part, wherein the under-core ply comprises a curved surface and wherein the core footprint comprises a perimeter projected onto the under-core ply and no portion of the perimeter extends beyond a boundary of the under-core ply;
      generating a bottom core surface of the additive 3D core from the under-core ply and core footprint, including by extracting the bottom core surface as a cropped shape from the under-core ply along the core footprint that matches a curvature of the curved surface of the under-core ply;
      accessing core design parameters for the additive 3D core, the core design parameters comprising core thickness parameters and core shape parameters that define the additive 3D core;
      constructing an additive 3D core design in the CAD model for the additive 3D core based on the generated bottom core surface and the core design parameters; and
      storing the additive 3D core design to support subsequent manufacture of the additive 3D core via additive manufacturing.

2. The method of claim 1, wherein generating the bottom core surface of the additive 3D core comprises determining an uncured thickness of plies in the composite part up to the under-core ply.

3. The method of claim 1, wherein constructing the additive 3D core design in the CAD model comprises computing a top core surface by offsetting the generated bottom core surface according to the core thickness parameters.

4. The method of claim 3, wherein the core shape parameters comprise parametric or geometric parameters that define a side surfaces of the additive 3D core; and
   wherein constructing the additive 3D core design in the CAD model comprises computing core side surfaces by applying the core shape parameters to define the side surfaces between the computed top and bottom core surfaces of the additive 3D core.

5. The method of claim 1, where the additive 3D core design constructed in the CAD model is represented as a boundary representation (B-Rep), surface mesh, faceted surface, or any combination thereof.

6. The method of claim 1, further comprising, prior to providing the additive 3D core design to the printing hardware:
   defining an interior composition of the additive 3D core.

7. The method of claim 6, where defining the interior composition comprises:
   identifying a cell shape and cell size from a 3D cell library, the cell shape and cell size selected to meet a predetermined performance capability for the additive 3D core; and
   defining the interior composition of the additive 3D core according to the cell shape and cell size.

8. A system comprising:
   a 3-dimensional (3D) core design engine configured to;
      determine, in a computer-aided design (CAD) model, an under-core ply of a composite part and a core footprint on the under-core ply specified for an additive 3-dimensional (3D) core to be manufactured via additive manufacturing for insertion into the composite part, wherein the under-core ply comprises a curved surface and wherein the core footprint comprises a perimeter projected onto the under-core ply and no portion of the perimeter extends beyond a boundary of the under-core ply;
      generate a bottom core surface of the additive 3D core from the under-core ply and core footprint, including by extracting the bottom core surface as a cropped shape from the under-core ply along the core footprint that matches a curvature of the curved surface of the under-core ply;
access core design parameters for the additive 3D core, the core design parameters comprising core thickness parameters and core shape parameters that define the additive 3D core; and
construct an additive 3D core design in the CAD model based on the generated bottom core surface and the core shape parameters; and
a 3D core printing engine configured to store the additive 3D core design to support subsequent manufacture of the additive 3D core via additive manufacturing.

9. The system of claim 8, wherein the 3D core design engine is configured to generate the bottom core surface of the additive 3D core by determining an uncured thickness of plies in the composite part up to the under-core ply.

10. The system of claim 8, wherein the 3D core design engine is configured to construct the additive 3D core design in the CAD model by computing a top core surface by offsetting the generated bottom core surface according to the core thickness parameters.

11. The system of claim 10, wherein the core shape parameters comprise parametric or geometric parameters that define a side surfaces of the additive 3D core; and wherein the 3D core design engine is configured to construct the additive 3D core design in the CAD model by:
computing core side surfaces by applying the core shape parameters to define the side surfaces between the computed top and bottom core surfaces of the additive 3D core.

12. The system of claim 8, where the additive 3D core design constructed in the CAD model is represented as a boundary representation (B-Rep), surface mesh, faceted surface, or any combination thereof.

13. The system of claim 8, wherein the 3D core design engine is further configured to define an interior composition of the additive 3D core.

14. The system of claim 13, where the 3D core design engine is configured to define the interior composition by:
identifying a cell shape and cell size from a 3D cell library, the cell shape and cell size selected to meet a predetermined performance capability for the additive 3D core; and
defining the interior composition of the additive 3D core according to the cell shape and cell size.

15. A non-transitory machine-readable medium comprising instructions that, when executed by a processor, cause a computing system to:
determine, in a computer-aided design (CAD) model, an under-core ply of a composite part and a core footprint on the under-core ply, the under-core ply and core footprint specified for an additive 3-dimensional (3D) core to be manufactured via additive manufacturing and to be inserted into the composite part, wherein the under-core ply comprises a curved surface and wherein the core footprint comprises a perimeter projected onto the under-core ply and no portion of the perimeter extends beyond a boundary of the under-core ply;
generate a bottom core surface of the additive 3D core from the under-core ply and core footprint, including by extracting the bottom core surface as a cropped shape from the under-core ply along the core footprint that matches a curvature of the curved surface of the under-core ply;
access core design parameters for the additive 3D core, the core design parameters comprising core thickness parameters and core shape parameters that define the additive 3D core;
construct an additive 3D core design in the CAD model for the additive 3D core based on the generated bottom core surface and the core shape parameters; and
store the additive 3D core design to support subsequent manufacture of the additive 3D core via additive manufacturing.

16. The non-transitory machine-readable medium of claim 15, wherein the instructions, when executed by the processor, cause the computing system to generate the bottom core surface of the additive 3D core by:
determining an uncured thickness of plies in the composite part up to the under-core ply; and
setting a shape of the bottom core surface as a shape of a portion of the under-core ply as outlined by the core footprint.

17. The non-transitory machine-readable medium of claim 15, wherein the instructions, when executed by the processor, cause the computing system to construct the additive 3D core design in the CAD model by computing a top core surface by offsetting the generated bottom core surface according to the core thickness parameters.

18. The non-transitory machine-readable medium of claim 17, wherein the core shape parameters comprise parametric or geometric parameters that define a side surfaces of the additive 3D core; and
wherein the instructions, when executed by the processor, cause the computing system to construct the additive 3D core design in the CAD model by computing core side surfaces by applying the core shape parameters to define the side surfaces between the computed top and bottom core surfaces of the additive 3D core.

19. The non-transitory machine-readable medium of claim 15, where the additive 3D core design constructed in the CAD model is represented as a boundary representation (B-Rep), surface mesh, faceted surface, or any combination thereof.

20. The non-transitory machine-readable medium of claim 15, wherein the instructions, when executed by the processor, further cause the computing system to, prior to providing the additive 3D core design to the printing hardware:
identify a cell shape and cell size from a 3D cell library, the cell shape and cell size selected to meet a predetermined performance capability for the additive 3D core; and
define an interior composition of the additive 3D core according to the cell shape and cell size.

* * * * *